G. W. BROWN.

SEED-PLANTER.

No. 6,756. Reissued Nov. 23, 1875.

Witnesses:

A. McCallum

H. Knight

Inventor:

Geo. W. Brown,

By W. B. Richards,

Atty.

N. PETERS, PHOTO-LITHOGRAPHER, WASHINGTON, D. C.

UNITED STATES PATENT OFFICE.

GEORGE W. BROWN, OF GALESBURG, ILLINOIS.

IMPROVEMENT IN SEED-PLANTERS.

Specification forming part of Letters Patent No. 99,286, dated February 1, 1870; reissue No. 6,756, dated November 23, 1875; application filed January 2, 1875.

DIVISION B.

*To all whom it may concern:*

Be it known that I, GEORGE W. BROWN, of Galesburg, county of Knox and State of Illinois, have invented a new and valuable Improvement in Seed-Planters; and I do hereby declare that the following is a full, clear, and exact description of the construction and operation of the same, reference being had to the annexed drawings, making a part of this specification, and to the letters and figures of reference marked thereon.

Figure 1:
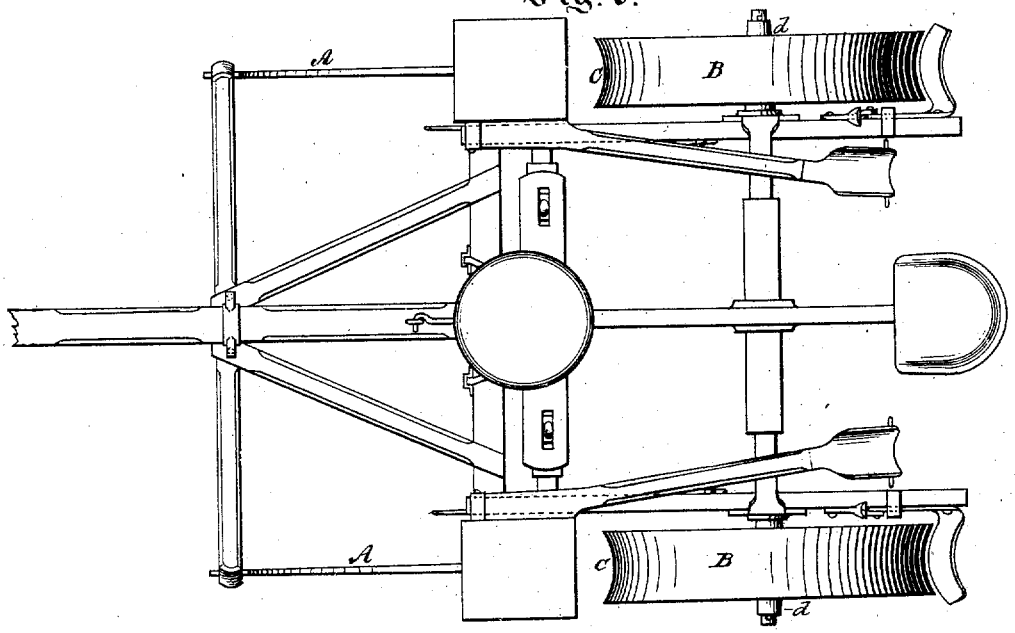
Figure 2:
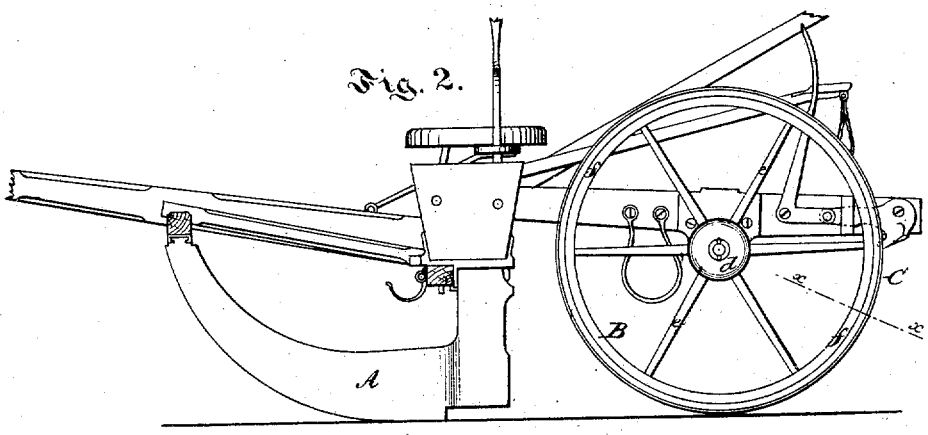
Figure 3:
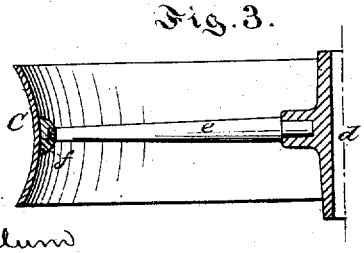
Figure 4:
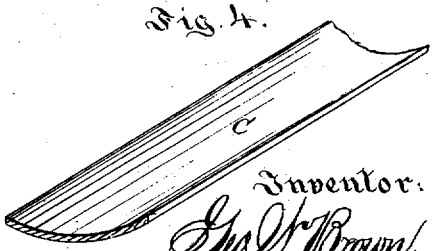

Figure 1 of the drawing is a top view of a machine embodying my invention. Fig. 2 is a side elevation. Fig. 3 is a sectional view of one of the wheels, on the line *x x* in Fig. 2. Fig. 4 is a perspective view of one of the blanks for forming the grooved wheel-rim.

This invention relates to that class of seed-planters in which a rear main frame mounted on wheels follows a forward frame carrying the runner or furrow-opener, and the seed-dropping mechanism, and in which said supporting-wheels have a concave outer surface or periphery, to facilitate covering the seed deposited by the dropping mechanism, and to increase their strength; and the invention consists in making the concave rim of said wheels from wrought-iron blanks, concave on one side and convex on the other, all as hereinafter fully described.

This invention is designed to be an improvement upon the various inventions of seed-planters which I have made heretofore, and for which I have several patents, and the frame-work and seed-dropping devices may be constructed, as shown in the drawings, similar to that described in said patents, or of any other ordinary construction, in which runners or furrow-openers A precede and open the furrow in which the seed are deposited, and are followed by the wheels B, having annularly concave peripheries.

In manufacturing these wheels of wrought-iron I use plate or heavy sheet-iron; but I prefer to make them of heavy sheet-iron cut into strips of the proper width and then rolled, pressed, or stamped into concavo-convex blanks C, such as shown at Fig. 4. These blanks I then bend into circular form, as shown at Fig. 2, and weld them, after which they may be again rolled to give them complete form.

The central parts of the wheel may be made in different ways. That shown in the drawings consists of a metallic hub, *d*, with wooden spokes *e*, and a narrow wooden felly, *f*, which receives the outer ends of the spokes. The outer faces of the fellies are grooved to correspond with the inner face of the rim C, and the rim is heated and shrunk thereon in the ordinary manner. For greater security a few rivets or screw-nails may be inserted.

The advantages of this wrought-iron wheel over a cast-iron wheel are very great. It can be made much lighter and neater without the liability to destructive breaking, or breaking to partially destroy its efficiency, to which the cast-iron wheel is always subject.

What I claim as new, and desire to secure by Letters Patent, is—

The corn-planter wheel-rim blanks C, constructed, as described, of concavo-convex strips of wrought-iron, substantially as described, and for the purpose specified.

GEORGE W. BROWN.

Witnesses:

M. D. HEBBERD,

J. J. TUNNICLIFF.